(12) United States Patent
Lane

(10) Patent No.: US 10,964,326 B2
(45) Date of Patent: Mar. 30, 2021

(54) SYSTEM AND METHOD FOR AUDIO-VISUAL SPEECH RECOGNITION

(71) Applicant: CARNEGIE MELLON UNIVERSITY, a Pennsylvania Non-Profit Corporation, Pittsburgh, PA (US)

(72) Inventor: Ian Richard Lane, Sunnyvale, CA (US)

(73) Assignee: CARNEGIE MELLON UNIVERSITY, a Pennsylvania Non-Profit Corporation, Pittsburgh, PA (US)

(*) Notice: Subject to any disclaimer, the term of this patent is extended or adjusted under 35 U.S.C. 154(b) by 0 days.

(21) Appl. No.: 15/435,259

(22) Filed: Feb. 16, 2017

(65) Prior Publication Data
US 2017/0236516 A1 Aug. 17, 2017

Related U.S. Application Data

(60) Provisional application No. 62/389,061, filed on Feb. 16, 2016.

(51) Int. Cl.
| | | |
|---|---|---|
| G10L 15/00 | (2013.01) |
| G10L 15/26 | (2006.01) |
| G10L 15/25 | (2013.01) |
| G10L 15/16 | (2006.01) |
| G10L 15/02 | (2006.01) |
| G06K 9/62 | (2006.01) |
| G06K 9/00 | (2006.01) |
| G06T 7/11 | (2017.01) |

(52) U.S. Cl.
CPC .......... *G10L 15/25* (2013.01); *G06K 9/00268* (2013.01); *G06K 9/6267* (2013.01); *G06T 7/11* (2017.01); *G10L 15/02* (2013.01); *G10L 15/16* (2013.01); *G06T 2207/10004* (2013.01); *G06T 2207/20084* (2013.01); *G06T 2207/30201* (2013.01)

(58) Field of Classification Search
CPC ......... G10L 15/16; G10L 15/25; G10L 15/22; G10L 15/265; G06K 9/00268; G06K 9/6267; G06T 2207/20084; G06T 2207/30201
USPC ................................................. 704/202, 232
See application file for complete search history.

(56) References Cited

U.S. PATENT DOCUMENTS

| | | | | |
|---|---|---|---|---|
| 5,806,036 A * | 9/1998 | Stork | ...................... | G10L 15/25 379/52 |
| 2002/0028021 A1* | 3/2002 | Foote | ................. | G06K 9/00758 382/224 |

(Continued)

OTHER PUBLICATIONS

Miao, "Distance-aware DNNs for robust speech recognition." Sep. 2015, In Sixteenth Annual Conference of the International Speech Communication Association. 2015, pp. 761-765.*

(Continued)

*Primary Examiner* — Olujimi A Adesanya
(74) *Attorney, Agent, or Firm* — Michael G. Monyok

(57) ABSTRACT

Disclosed herein is method of performing speech recognition using audio and visual information, where the visual information provides data related to a person's face. Image preprocessing identifies regions of interest, which is then combined with the audio data before being processed by a speech recognition engine.

8 Claims, 2 Drawing Sheets

(56) References Cited

U.S. PATENT DOCUMENTS

| | | | | |
|---|---|---|---|---|
| 2003/0018475 | A1* | 1/2003 | Basu | G10L 15/25 |
| | | | | 704/270 |
| 2004/0056907 | A1* | 3/2004 | Sharma | G06K 9/00335 |
| | | | | 715/863 |
| 2004/0267521 | A1* | 12/2004 | Cutler | G10L 15/25 |
| | | | | 704/202 |
| 2011/0075025 | A1* | 3/2011 | Cho | G06T 3/4053 |
| | | | | 348/441 |
| 2014/0365221 | A1* | 12/2014 | Ben-Ezra | G10L 15/142 |
| | | | | 704/256.1 |
| 2016/0071024 | A1* | 3/2016 | Amer | G06N 20/00 |
| | | | | 706/12 |
| 2016/0314789 | A1* | 10/2016 | Marcheret | G10L 15/25 |
| 2016/0321784 | A1* | 11/2016 | Annapureddy | G06K 9/66 |
| 2017/0061966 | A1* | 3/2017 | Marcheret | G06K 9/00718 |

OTHER PUBLICATIONS

Noda et al, "Audio-visual speech recognition using deep learning" Dec. 2014, Springer Publication, pp. 722-737.*
Aggarwal et al, "Acoustic modeling problem for automatic speech recognition system: advances and refinements (Part II).", International Journal of Speech Technology 14.4 (2011): 309=320.*
Mroueh et al, "Deep multimodal learning for audio-visual speech recognition", Apr. 2015, Acoustics, Speech and Signal Processing (ICASSP), 2015 IEEE International Conference on. IEEE, 2015, 2130-34.*
Katsaggelos et al, "Audiovisual fusion: Challenges and new approaches", Sep. 2015, Proceedings of the IEEE. Sep. 2015;103(9): 1635-53.*
Hori et al, "Efficient WFST-based one-pass decoding with on-the-fly hypothesis rescoring in extremely large vocabulary continuous speech recognition", 2007, IEEE Transactions on audio, speech, and language processing, 15(4), 1352-1365.*
Potamianos et al, "Recent advances in the automatic recognition of audiovisual speech", 2003, In Proceedings of the IEEE. Sep. 8, 2003;91(9):1306-26.*
Kim, J. et al. "Accelerating large vocabulary continuous speech recognition on heterogeneous cpu-gpu platforms." In Acoustics, Speech and Signal Processing (ICASSP), 2014 IEEE International Conference on, pp. 3291-3295. IEEE, 2014.
Kim, J. et al. "Hydra—A hybrid cpu/gpu speech recognition engine for real-time LVCSR." In GPU Technology Conference. 2013.
Kim, J. et al. "Efficient On-The-Fly Hypothesis Rescoring in a Hybrid GPU/CPU-based Large Vocabulary Continuous Speech Recognition Engine." In InterSpeech, pp. 1035-1038. 2012.
Netian, A. V. et al. "Dynamic Bayesian networks for audio-visual speech recognition." EURASIP Journal on Advances in Signal Processing 2002, No. 11 (2002): 783042.
Duchnowski, P. et al. "Toward movement-invariant automatic lip-reading and speech recognition." In Acoustics, Speech, and Signal Processing, 1995. ICASSP-95., 1995 International Conference on, vol. 1, pp. 109-112. IEEE, 1995.
Kratt, J. et al. "Large vocabulary audio-visual speech recognition using the Janus speech recognition toolkit." Pattern Recognition (2004): 488-495.
Liu, X. et al. "Audio-visual continuous speech recognition using a coupled hidden Markov model." In Seventh International Conference on Spoken Language Processing. 2002.
Kolossa, D. et al. "Audiovisual speech recognition with missing or unreliable data." In AVSP, pp. 117-122. 2009.
Potamianos, G. et al. "Audio-visual automatic speech recognition: An overview." Issues in visual and audio-visual speech processing 22 (2004): 23.
Sui, C. et al. "A 3D audio-visual corpus for speech recognition." In Proceedings of the 14th Australasian International Conference on Speech Science and Technology, Sydney, Australia, vol. 36, p. 125-128. 2012.
Hasegawa-Johnson, M. et al. "Audiovisual speech recognition with articulator positions as hidden variables." In Proc. International Congress of Phonetic Sciences (ICPhS). 2007.
Papandreou, G. et al. "Adaptive multimodal fusion by uncertainty compensation with application to audiovisual speech recognition." IEEE Transactions on Audio, Speech, and Language Processing 17, No. 3 (2009): 423-435.
Basu, S. et al. "Audio-visual large vocabulary continuous speech recognition in the broadcast domain." In Multimedia Signal Processing, 1999 IEEE 3rd Workshop on, pp. 475-481. IEEE, 1999.
Livescu, K. et al. "Articulatory feature-based methods for acoustic and audio-visual speech recognition: Summary from the 2006 JHU summer workshop." In Acoustics, Speech and Signal Processing, 2007. ICASSP 2007. IEEE International Conference on, vol. 4, pp. IV-621. IEEE, 2007.
Kolossa, D. et al. "Efficient manycore CHMM speech recognition for audiovisual and multistream data." In Eleventh Annual Conference of the International Speech Communication Association. 2010.
Chong, J. et al. An automatic speech recognition application framework for highly parallel implementations on the gpu. Tech. Rep. UCB/EECS-2012-47, EECS Department, University of California, Berkeley, 2012.
Ngiam, J. et al. "Multimodal deep learning." In Proceedings of the 28th international conference on machine learning (ICML-11), pp. 689-696. 2011.
Carneiro, G. et al. "The fusion of deep learning architectures and particle filtering applied to lip tracking." In Pattern Recognition (ICPR), 2010 20th International Conference on, pp. 2065-2068. IEEE, 2010.
Le, Quoc V. et al. "Building high-level features using large scale unsupervised learning." In Acoustics, Speech and Signal Processing (ICASSP), 2013 IEEE International Conference on, pp. 8595-8598. IEEE, 2013.
Coates, A. et al. "An analysis of single-layer networks in unsupervised feature learning." In Proceedings of the fourteenth international conference on artificial intelligence and statistics, pp. 215-223. 2011.
Sermanet, P. et al. "Traffic sign recognition with multi-scale convolutional networks." In Neural Networks (IJCNN), The 2011 International Joint Conference on, pp. 2809-2813. IEEE, 2011.
Ngiam, J. et al. "Tiled convolutional neural networks." In Advances in neural information processing systems, pp. 1279-1287. 2010.
Socher, R. et al. "Convolutional-recursive deep learning for 3d object classification." In Advances in Neural Information Processing Systems, pp. 656-664. 2012.
Bo, L. et al. "Unsupervised feature learning for RGB-D based object recognition." In Experimental Robotics, pp. 387-402. Springer International Publishing, 2013.
Ciresan, D. C. et al. "Flexible, high performance convolutional neural networks for image classification." In IJCAI Proceedings—International Joint Conference on Artificial Intelligence, vol. 22, No. 1, p. 1237. 2011.
Chen, F. et al. "Deep learning shape priors for object segmentation." In Proceedings of the IEEE Conference on Computer Vision and Pattern Recognition, pp. 1870-1877. 2013.

* cited by examiner

SYSTEM AND METHOD FOR AUDIO-VISUAL SPEECH RECOGNITION

CROSS-REFERENCE TO RELATED APPLICATIONS

This application claims the benefit under 35 U.S.C. § 119 of Provisional Application Ser. No. 62/389,061, filed Feb. 16, 2016, which is incorporated herein by reference.

STATEMENT REGARDING FEDERALLY SPONSORED RESEARCH

Not applicable.

BACKGROUND OF THE INVENTION

The invention relates generally speech recognition. More specifically, the invention relates to a method of performing speech recognition at a distance using audio and visual information.

Microphone array processing is a common approach applied in distance speech recognition. When the signals from individual microphones in an array are suitably combined, the array functions as a spatial filter capable of suppressing noise, reverberation, and competing speech. Such beam-forming techniques have received a great deal of attention in recent research. Although current approaches for microphone array processing have been shown to improve the signal-to-noise ratio for speech signal, there is no guarantee that the single output from the microphone array is optimized for speech recognition accuracy.

There has also been significant work on audio-visual speech recognition in the past two decades. Prior approaches differ in the front-end visual processing applied, the audio-visual integration strategy, and the speech recognition method used. The majority of systems outperformed audio-only speech recognition over a wide range of conditions. However, improvements were typically demonstrated on databases of small duration, and, in most cases, limited to a very small number of speakers and to small vocabulary tasks.

It would therefore be advantageous to develop of method of distance speech recognition that is capable of using audio and visual information to improve accuracy.

BRIEF SUMMARY

According to embodiments of the present invention is method of performing speech recognition at a distance using audio and visual information.

DETAILED DESCRIPTION

According to embodiments of the present invention is a method of performing speech recognition at a distance. In one embodiment, the method provides for robust distance speech recognition that leverages multiple microphones as well as visual information from an image sensor. The method utilizes a joint model for audio-visual speech recognition based on Deep-Neural-Networks (DNN), in which the visual information informs both the beam-forming process and the speech recognition model to realize accurate and robust speech recognition even at distance.

DNN's have been shown to obtain state-of-the-art performance across many image and speech processing tasks. However, there has been little exploration on how best to: (1) effectively model temporal changes within these models; and (2) combine information from these different modalities, such as audio and visual information within a single DNN structure.

According to embodiments of the present invention, two main steps of the method comprise image preprocessing and audio-visual feature combination for speech recognition. In the first step, image preprocessing is performed to provide context about the information provided in the image. For example, in an image of containing a person's face, image preprocessing can: (1) determine the relative location of the person (and the person's mouth) to the image capture/microphone system, and (2) extract the most relevant features from the image to help inform the speech recognition process. Often, image preprocessing is typically performed using hand-crafted filters. However, the method of the present invention uses DNN's for image processing, learning the most relevant image features for the speech recognition tasks directly from data collected.

Figure 1:
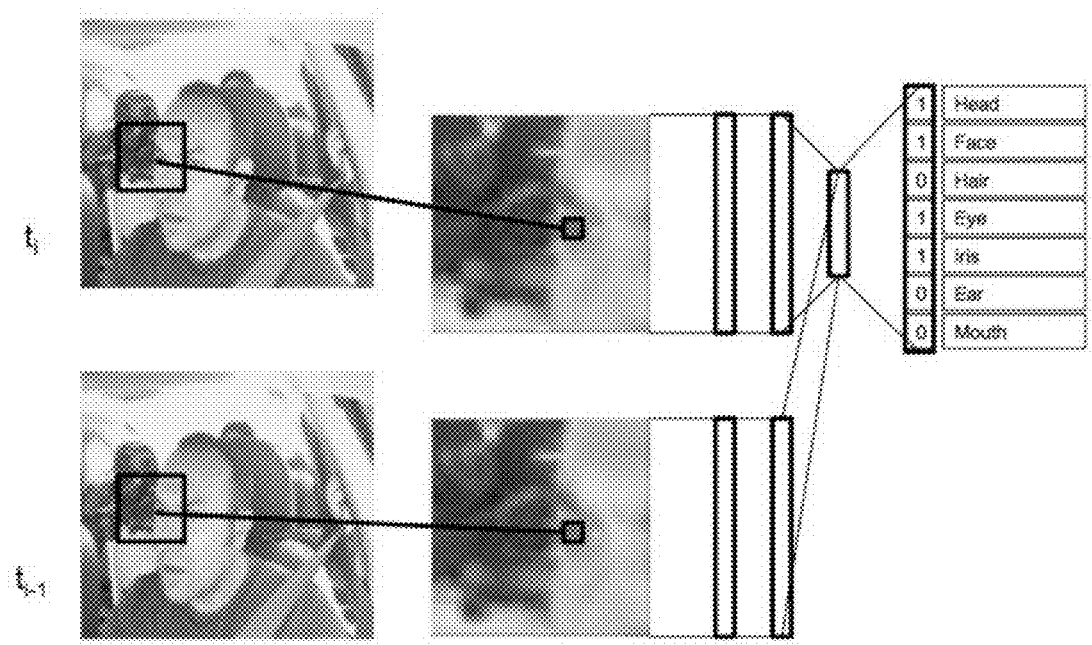
FIG. 1 is flowchart depicted feature detection.

As such, image preprocessing is based on recurrent DNN filters. An overview of this approach is shown in FIG. 1. In this approach, each pixel in the captured image data (i.e. the input image) is classified as belonging to one or more classes of interest, for example, head, eye, or mouth of the person. A single DNN classifier (approx. 64×64 in size) is applied to each pixel in the input image and the output of the classifier is used to generate a probability distribution of classes for each pixel in the image. A region-of-interest (ROI) for a specific class label can then be defined, maximizing the probability of that class being within the ROI.

To improve the consistency across neighboring frames in an image stream, rather than just using knowledge from the current frame for pixel-level classification, in one embodiment a recurrent DNN model is utilized, where information from the previous frame ($t_{i-1}$) is used when classifying the same pixel location in frame ($t_i$). By introducing the recurrent model, the robustness of the system improves significantly due to the image tracking capabilities that is introduced.

The approach is able to locate if a person is present in the image data and to provide the relative position of the person to the image capture device. Further, the method extracts a region of interest around the person's mouth that can subsequently be used for audio-visual speech recognition. As a person having skill in the art will appreciate, the effectiveness of this approach depends in part on image resolution and DNN model structures, which can vary depending on the application.

Figure 2:
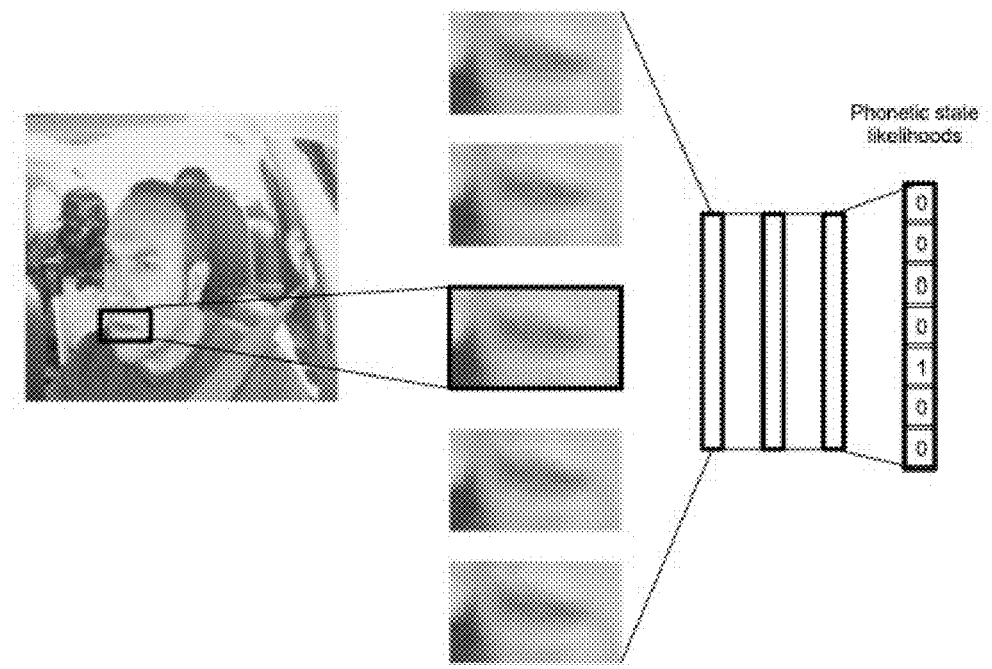
FIG. 2 is an example of visual speech processing.

Once a ROI around the mouth of the person is detected, the region is scaled to an appropriate size and combined with similar mouth ROI in neighboring frames. For example, FIG. 2 shows a window of 5 frames ($t_{i-2}, t_{i-1}, t_i, t_{i+1}, t_{i+2}$) with the ROI isolated. By performing alignment with the acoustic data, a DNN classifier for the image stream can be trained to classify individual frames into context-dependent phonetic states as used by the acoustic model.

Once the image preprocessing process is complete, the method can utilize one of several methods to combine audio and visual information within a single DNN classifier. Given acoustic features from one or more microphones and visual features (YUV pixel values) for the ROI of the mouth over a specific time window, the classifier will be trained to generate the observation probabilities for the speech recognition engine. During training, acoustic frames will be automatically aligned and labeled with a specific context-dependent phonetic state. During the speech recognition process audio and image frames will be captured, feature extraction will be performed, and then a joint audio-visual observation model will be applied to generate the observation probabilities for the context-dependent phonetic states (i.e. HMM state likelihoods) used within the acoustic model. A search is then conducted as in a standard audio-only speech recognition engine. Examples of combining the audio and visual information can include early combination and late combination. Further, independent or joint training can be utilized.

Figure 3:
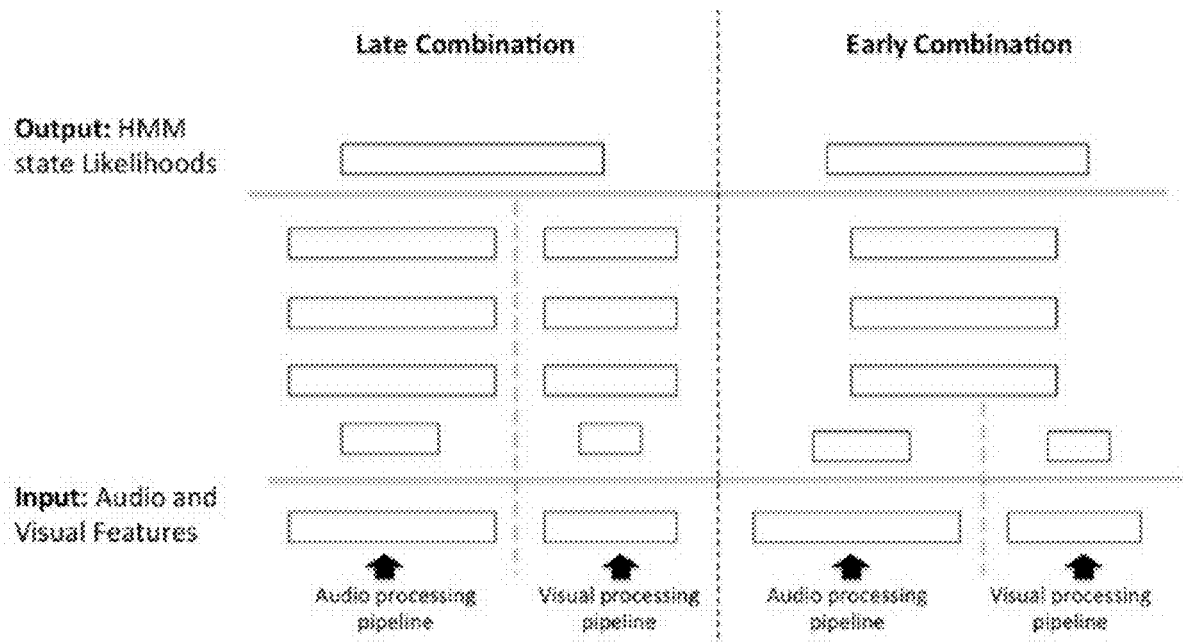
FIG. 3 is a diagram depicting two different processes for combining audio and visual information.
Figure 4:
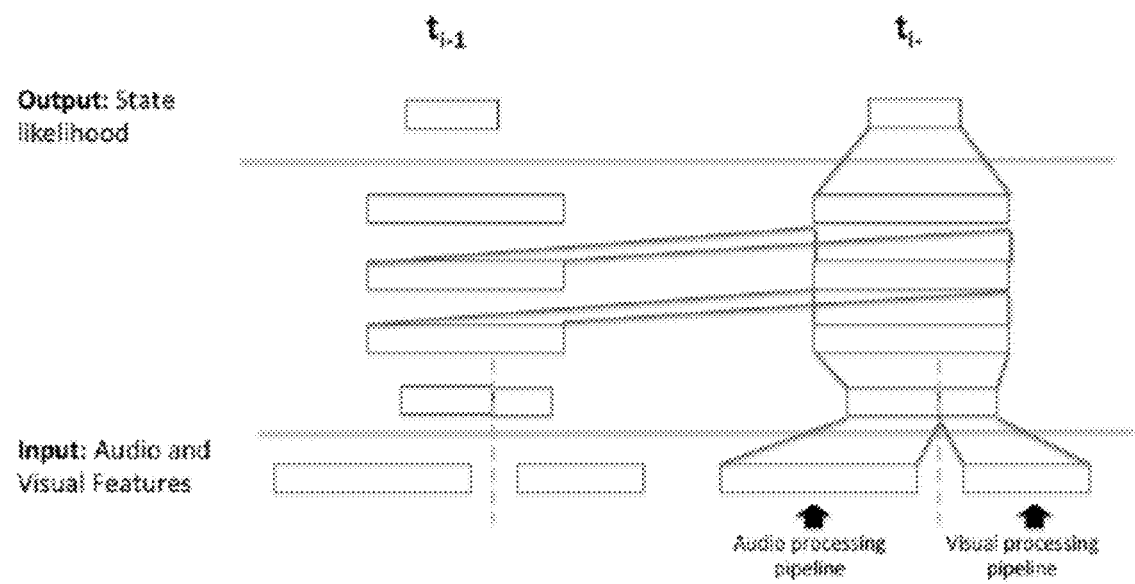
FIG. 4 shows the network structure for a recurrent neural network, combining audio and visual features.

An example of two different network structures is shown in FIG. 3. In the first model (Late Combination), information from the audio and visual streams is not shared until the output layer of the model. This structure differs significantly from the Early Combination model, in which information across the audio and visual streams are shared in the second hidden layer of the DNN. Performance of the speech recognition will be impacted by the manner in which the information is combined. In addition to the model structures shown in FIG. 3, alternative embodiments use recurrent neural networks as shown in FIG. 4. Other factors that affect performance of the system include the number and size of hidden layers used within the model, the size of any audio or image specific sub-networks within the model, and the number of recurrent connections.

Leveraging DNN methods for both the image preprocessing and audio-visual speech recognition components enables use of a consistent architecture throughout the system and integration into a WFST-based speech recognition engine.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of performing speech recognition at a distance comprising:
   obtaining audio information from a plurality of microphones positioned at a distance from a speaker;
   obtaining visual information from an image capture device;
   pre-processing the visual information, wherein pre-processing comprises:
      using a recurrent deep neural network model to identify relevant image features by classifying a pixel in a first frame of the visual information using features from a pixel in the same location from a prior frame of the visual information;
      identifying a region of interest in the visual information; and
      using the region of interest, aligning the visual information with the acoustic information and classifying individual frames in the visual information into context-dependent phonetic states;
   combining the audio information and visual information within a single deep neural network classifier; and
   performing a speech recognition process on the combined audio information and visual information, wherein the speech recognition process comprises:
      generating observation probabilities for context-dependent phonetic states using a joint audio-visual observation model, and
      conducting a search in a standard speech recognition engine using the observation probabilities.

2. The method of claim 1, wherein pre-processing further comprises:
   determining whether a speaker is present in the visual information.

3. The method of claim 1, wherein the standard speech recognition engine is a WFST-based speech recognition engine.

4. The method of claim 1, wherein pre-processing further comprises:
   defining the region of interest by generating a probability distribution of classes for each pixel in the visual information.

5. The method of claim 1, further comprising:
   identifying a location of the speaker relative to the image capture device.

6. The method of claim 1, wherein pre-processing further comprises:
   scaling the region of interest.

7. The method of claim 1, wherein combining the audio information and visual information comprises:
   combining the audio information and the visual information in an output layer of the single deep neural network classifier.

8. The method of claim 1, wherein combining the audio information and visual information comprises:
   combining the audio information and the visual information in a second hidden layer of the single deep neural network classifier.

* * * * *